(12) United States Patent
Wu et al.

(10) Patent No.: US 8,219,492 B2
(45) Date of Patent: Jul. 10, 2012

(54) SYSTEM AND METHOD FOR INTERNET MARKETING BY ENDORSEMENTS

(75) Inventors: Su-Lin Wu, San Carlos, CA (US); Erick Cantu-Paz, Sunnyvale, CA (US); Christopher John Leggetter, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 696 days.

(21) Appl. No.: 11/958,300

(22) Filed: Dec. 17, 2007

(65) Prior Publication Data

US 2009/0157559 A1 Jun. 18, 2009

(51) Int. Cl.
*G06Q 40/00* (2006.01)
(52) U.S. Cl. ............ 705/50; 705/74
(58) Field of Classification Search .......... 705/50, 705/74
See application file for complete search history.

(56) References Cited

U.S. PATENT DOCUMENTS 5,862,223 A * 1/1999 Walker et al. ............ 705/50

OTHER PUBLICATIONS http://search.yahoo.com/search?p=tennis+rackets&fr=yfp-t-501&toggle=1&cop=mss&ei=UTF-8; Dec. 8, 2007; 2 pages. ("Example of sponsored search results").

* cited by examiner

*Primary Examiner* — Daniel Felten
(74) *Attorney, Agent, or Firm* — Fiala & Weaver P.L.L.C.

(57) ABSTRACT

A method of facilitating the endorsement of products through Internet advertisements accepts a bid for an endorsement, enables communication, associated with the bid, between an advertiser and a potential endorser, and serves an endorsement associated with the bid. In one implementation, the endorsement is displayed together with a symbol verifying the endorser.

22 Claims, 3 Drawing Sheets

SYSTEM AND METHOD FOR INTERNET MARKETING BY ENDORSEMENTS

BACKGROUND

1. Field of the Invention

Aspects of the present invention relate generally to a system for enabling users to endorse products through Internet advertisements, and for advertisers to control who endorses their products.

2. Description of Related Art

As is known in the art, Internet advertisements may consist of text-based ads, pop-ups, images, etc. Various methods currently exist for relating particular advertisements to particular content; for example, an advertising system may parse a web page's source code to determine what the page is generally about, and then present advertisements against the deduced topics/subjects.

In the non-Internet world, the "product endorsement" is common. As is generally known, a product endorsement may be thought of as a recommendation by some person for a particular product (e.g., celebrity John Doe recommends a certain brand of chewing gum, etc.). Endorsements can be very effective and can help both the endorser gain wider public appeal and the advertiser sell more product. Despite the online advertising boom, there currently exists no end-to-end, real-world-to-online translation of the endorsement-marketing concept.

Moreover, the brick-and-mortar world generally requires endorsers to be well-known celebrities, who can usually be afforded only by large, well-to-do companies. Much like the Internet's general democratization of advertisements, so too can it make endorsements accessible to a larger population. For example, instead of a popular sports star endorsing a cereal, you may have a reality TV personality endorsing a brand of clothing associated with the show on which she appears. As another example, consider a master gardener in the San Franscisco area—a "micro"-celebrity—endorsing plant shops local to him; by allowing "micro"-celebrities to endorse products, the "long tail" of products can be brought together with the "long tail" of endorsers.

Thus, it would be desirable to enable persons to be paid for endorsing products on the Internet, and to make the entire process easy for both advertisers and endorsers.

SUMMARY

In light of the foregoing, it is a general object of the present invention to enable the endorsement of products on the Internet, giving both the endorser and the advertiser control over the ultimate endorsement and its associated terms.

BRIEF DESCRIPTION OF THE DRAWING FIGURES

DETAILED DESCRIPTION

Figure 1:
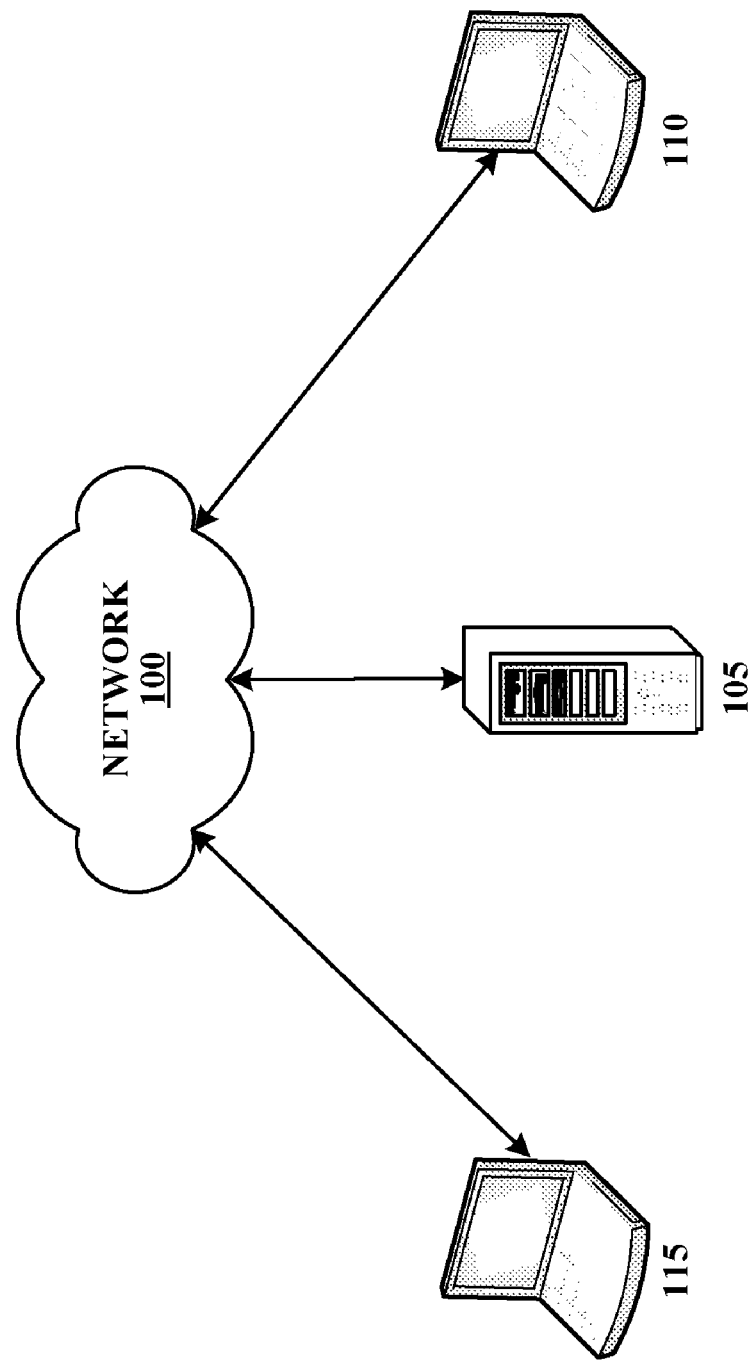
FIG. 1 is a simplified block diagram illustrating how the invention may be employed in accordance with the detailed description.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of providing to endorsers and advertisers a means through which they may coordinate their endorsements.

Throughout this description, reference is made to "text ads," which is used to denote plain-text ads that usually link (using, for example, a Universal Resource Indicator (URI)) to a site or service selling the product advertised through the text. The phrase "display ads" is used to denote the types of Internet advertisements other than text ads, such as, for example, images, videos, etc. Display ads may or may not appear on the current page of content, and may instead appear in a pop-up, etc. Also, and as used herein, "endorsement" is used to denote a text and/or display ad that includes some form of endorsement or recommendation, as provided by the invention and further detailed herein.

Throughout this disclosure, reference is made to "bid," which is used to denote some value (e.g., dollar amount, etc.) that either the endorser is willing to be paid for his services, or the advertiser is willing to pay the endorser. It will be understood that some baseline value will likely need to be ascribed to a bid, such that its monetary value may be estimated. For example, a bid may consist of both a dollar amount and time span for which an endorsement may be used by the advertiser (e.g., a potential endorser may bid $100 to endorse a particular product through a particular endorsement for a period of 30 days, etc.). In some cases, a bid may be nothing more than an interest expressed by an advertiser or a potential endorser that he would like to enter into an agreement for a particular endorsement.

Throughout this disclosure, reference is made to "advertising infrastructure," which is used to denote a system through which an Internet advertising network operates (e.g., Yahoo's® Publisher Network, etc.). There are currently numerous advertising infrastructures (e.g., those run by Yahoo!®, Google™, etc.) and most offer similar services, such as, for example, the serving of advertisements; "serving," as understood in the art, is the mechanism by which advertisements are delivered to web pages. As another example, such an infrastructure may handle user accounts, where the users are producers of content on the Internet who want to place ads next to their content; the advertising infrastructure may serve advertisements in response to a request from a content producer's web page (through code supplied by the advertising infrastructure) to display the advertisements next to their content. Often, the advertising infrastructure is linked to a search engine, and displays possibly relevant advertisements together with search results.

Generally, advertising infrastructures may also handle payments from advertisers in exchange for having their advertisements served through the infrastructure, and payments to those content producers whose sites display ads provided by the advertising infrastructure (where such payment is usually predicated on the number of clicks and/or impressions generated by the advertisement on the page).

The invention adds another element to the advertising infrastructure—the "ad exchange"—a mechanism through which endorsers and advertisers may determine what it is they are endorsing and advertising and the various terms surrounding such a transaction. Reference to the "system" throughout this disclosure denotes the advertising infrastructure together with the ad exchange.

FIG. 1 is a simplified functional block diagram illustrating the general architecture of one embodiment of the invention. Advertising infrastructure 105 may be an advertising network already in place (as described above) and may include any of a number of servers, databases, etc. required for its operation; advertising infrastructure 105 may also power the ad exchange described above. Advertiser 110 is the person(s) in charge of buying advertisements for his products to be shown on search results pages ("sponsored search results") and other places where the advertising infrastructure reaches (e.g., context-specific ads shown on web pages, etc.). It will be appreciated that Advertiser 110 may not be the producer, manufacturer, etc. of the product being endorsed; obviously in such a case, the advertiser may need to get permission from the producer, manufacturer, etc. before using an endorser for a particular product.

Endorser 115 is the person(s) endorsing a product (or potentially endorsing a product). Advertising infrastructure 105, Advertiser 110, and Endorser 115, are linked together through Network 100 (e.g., the Internet, etc.).

Figure 2:
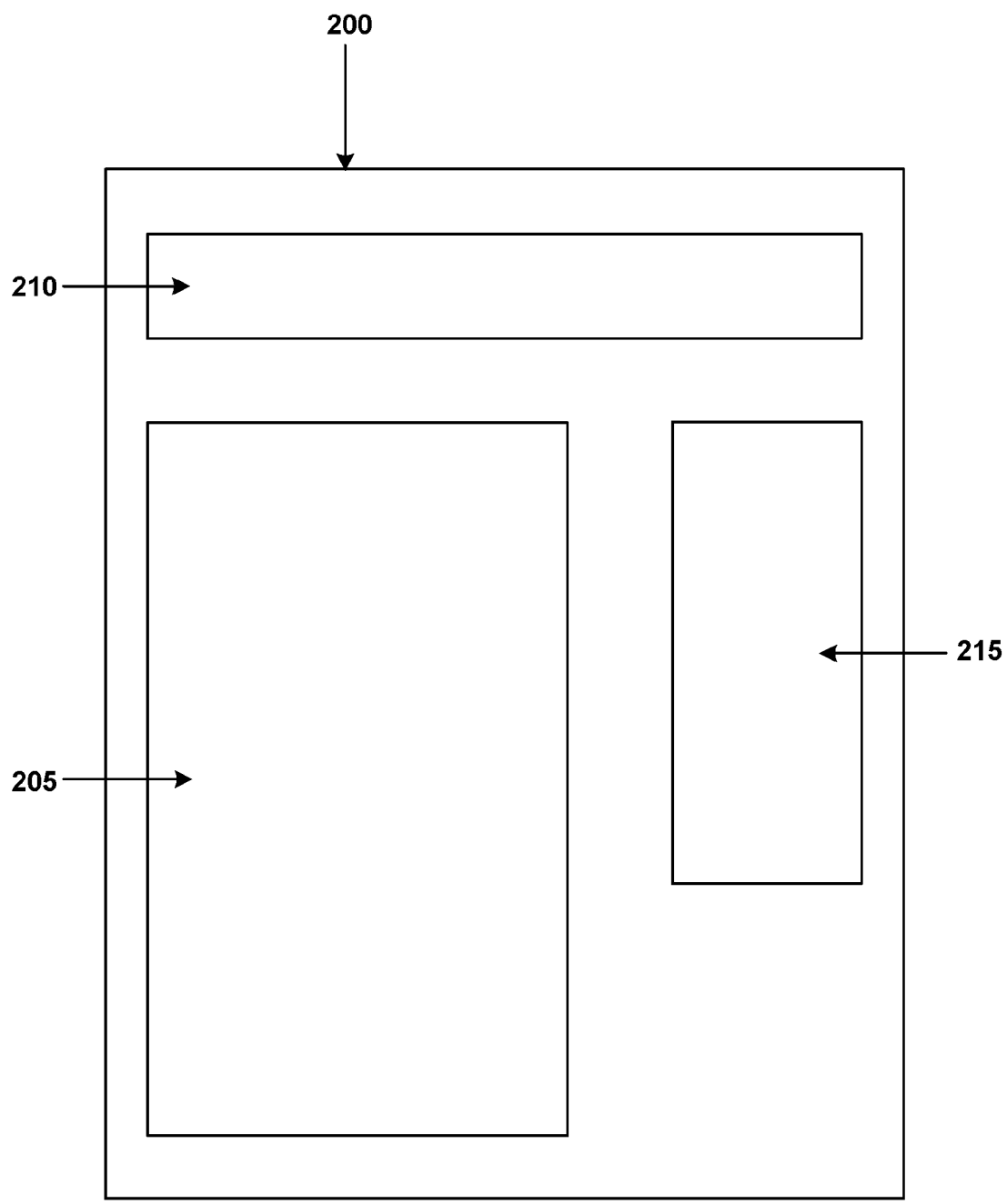
FIG. 2 illustrates generally the way in which endorsements may be displayed on a web page.

Apart from the "ad exchange" element, endorsements may work in a way similar to the way other ads are already delivered through the advertising infrastructure. More specifically, the endorsements may be "picked" the same way as, and shown together with, other ads that do not carry endorsements. For example, and as shown in FIG. 2, an endorsement may appear next to search results after a user performs a search through a search engine. Search results page 200 displays search results 205, ads 210 and endorsement(s) 215. For example, if a user searches for "tennis rackets," ads 210 may include those ads that might normally be generated for such a search (e.g., sponsored search results, etc.), and endorsement 215 may include an endorsement from a professional tennis player recommending a certain brand of racket. It will be appreciated by those of skill in the art that page 200 is not limited to a search results page and may be any web page that displays ads served from the advertising infrastructure, as detailed herein.

Further to ads displayed alongside search query results, advertisers may select various keywords or phrases for each endorsement, so that the endorsement might be shown alongside particular search queries, just as advertisers can currently do now when purchasing ad slots. For example, if an advertiser pays for the search phrase "tennis rackets buy," and a user searches for that phrase, the endorsement (e.g., John Doe always uses X brand tennis rackets!") might appear together with the search results.

Additionally, advertisers may also choose to target the endorsements by geography, or any of a host of other factors. For example, an advertiser—a local business—may wish to show an endorsement by a local sports star for a particular piece of sports equipment, but only when someone from that "region" is searching for something related to that topic (i.e., the advertiser may not want to pay to have an ad displayed to someone in California when his brick-and-mortar store is in New York). The way in which the system deduces local intent queries is not critical, but may include such indicators as a zip code in the query, the IP address of the user, etc.

Along similar lines, endorsements may be placed on web pages, which have code, supplied by the advertising infrastructure, embedded in them for displaying ads. Generally, such a system works by taking into account the content of the web page and displaying ads against that content (i.e., ads that may be relevant to the page's topic(s)). For example, if a web page is providing coverage of a recent tennis match, and the web page is also displaying ads delivered through some advertising infrastructure, the advertising infrastructure may parse and analyze the HTML that makes up the web page so as to attempt to discern the page's topic(s). Using the information gleaned from the analysis, the advertising infrastructure may serve to the web page ads previously purchased by advertisers looking to sell tennis rackets. In much the same way, endorsements may be sent to web pages outside of search results pages.

The ad exchange may be explained through the perspective of both the advertiser and the endorser, and both perspectives are discussed below. In either case, the ad exchange generally is a web site, accessible through, for example, a web browser, where both advertisers and endorsers can agree on what it is the endorser is endorsing, how much the advertiser will pay the endorser for the endorsement, and other relevant terms and conditions.

Generally, each endorser will maintain a profile on the system, which may include various information such as name, age, height, weight, description (e.g., claim to "frame" if "micro"-celebrity, etc.), success of past endorsement campaigns, etc. Endorser profiles may also include images of the endorser that the endorser agrees may be used to sell the advertiser's product. For example, an endorser might include a simple headshot to be included in an advertisement. Having such images within a profile may help the advertiser decide whether a particular endorser is right for a particular product, and may also allow the advertiser to generate mock-ups of the final endorsement (i.e., the image together with relevant text, etc.) to be approved by the endorser (as detailed below).

Similarly, advertisers may also maintain profiles containing information about their businesses, such as, for example, size (including, for example, number of employees, revenue, etc.), reputation (e.g., feedback from previous endorsers of their products, etc.), empirical data about previous endorsements, etc. Such information can help a potential endorser better evaluate the value and potential income of a relationship with a particular advertiser, especially when there are multiple advertisers to choose from (i.e., multiple advertisers are advertising the same product for which an endorser seeks to endorse).

To illustrate the ad exchange from the perspective of an advertiser, consider the following example. Assume that advertiser A sells a particular brand of clothing and wishes to find endorsers for the clothing. Advertiser A may login to the ad exchange and add to it the clothing products for which it seeks endorsements. Advertiser A may provide along with the listed products various considerations and requirements that must be met regarding the particular endorser (e.g., gender, age, sports star, etc.).

Upon listing the products for which it seeks endorsers, Advertiser A may do one of two things, namely search for an endorser that he thinks fits the bill, or wait for an endorser to contact Advertiser A regarding a possible endorsement. In the first scenario, Advertiser A may search the ad exchange for potential endorsers. Such a search may be facilitated by a query given to the system by Advertiser A, which the system may use to search profiles and other relevant information for a possible "match." Also, Advertiser A may list the various endorser profiles that exist on the system, sorted in any of a number of different ways, such as, for example, by name, age, products identified by endorsers as those they are willing to endorse, price endorsers want to charge, etc.

Similarly, endorsers can see and do various things through the ad exchange. In addition to maintaining their profiles, they may also seek out products they would like to endorse. For example, Endorser E, a sports star, may wish to endorse a certain brand of pain-relieving cream sold by Advertiser A. In such a case, Endorser E may search the ad exchange for various phrases, such as, for example, "sports cream," and sift through the results, which will have been built from the products previously listed by the various advertisers. An endorser might also wish to endorse a product that is not listed on the ad exchange (i.e., an advertiser has not yet indicated that he wants this particular product endorsed); in this case, an endorser may submit a bid for the product, together with the identity of an advertiser (e.g., name of advertiser, "account number" within the system, etc.) it knows sells the product.

It will be understood by those of skill in the art that there must be some verification of the endorser (i.e., a way for the ad exchange to know that the person is who he says he is), so as to build trust in the system. Such verification can be done in any of a number of different ways currently known in the art (e.g., the same way in which a bank verifies one's identity for a loan, etc.). The method through which identity is verified is non-critical and may encompass methods already implemented by the advertising infrastructure (e.g., the way in which it currently verifies a company wishing to sell ads on its network, etc.).

After verifying the endorser, a symbol—a "signature" or other identifier—may be used to signify that the endorsement is certified, legitimate, and credible. Such a verification element would discourage advertisers from signing up endorsers outside of the system because they would not be able to use the "verified by . . . " (or similar) symbol on the advertisement.

Figure 3:
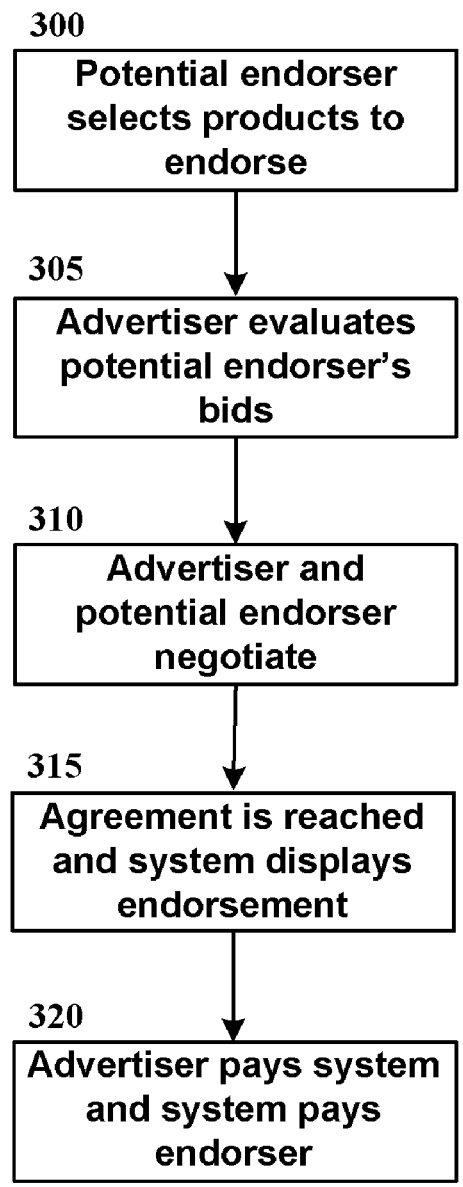
FIG. 3 is a logical flowchart of the general process by which an endorsement may be agreed upon and served.

FIG. 3 is a simplified flow chart illustrating a possible real-world example of the system in use. As illustrated at block 300, an endorser selects which products he may be willing to endorse. The perusal of the products available to be endorsed may be accomplished in a number of different ways. For example, the ad exchange may allow the potential endorser to browse through a list of available products (e.g., by category, type, price, etc.), where available products are those products already existing on the ad exchange (i.e., products previously listed by an advertiser and for which an endorser is desired). As another example, the ad exchange may provide search functionality to let a potential endorser search through the products awaiting endorsers. As yet another example, the ad exchange may allow the potential endorser to search for a particular advertiser (e.g., company, manufacturer, etc.), which may supply a list of all the products it sells and for which it would like endorsers.

As a potential endorser comes upon products he would like to endorse, he may select them (e.g., through a checkbox, radio button, etc.) and submit bids for each of them. As discussed above, bids may encompass more than just monetary amounts, and may or may not be negotiable, depending on the ad exchange, advertiser, potential endorser, etc. In one embodiment, bids may be accompanied by a separate value—"worth" or "effectiveness"—to denote the estimated influencing power that the particular endorser's name will likely have on the potential consumers viewing the endorsement. Such a value may be calculated in any of a number of different ways, including past performance of other, similar endorsements. For example, if an endorser endorsers a product for an advertiser for a period of one week, the performance of the endorsement may be compared to a similar advertisement (i.e., without the endorsement) run the previous week.

As illustrated at block 305, an advertiser selling a product recently bid on by a potential endorser may search the ad exchange and evaluate the bids. It will be appreciated that an advertiser may not need to "search" the ad exchange at all, but may instead be alerted to new bids through various mechanisms (e.g., e-mail, RSS, etc.).

If the advertiser comes upon a potential endorser whom he feels is right for the particular product bid on, he may enter into a negotiation with the potential endorser, as shown at block 310 and discussed briefly above; "negotiating" may encompass any of a number of different actions. For example, if the advertiser and the potential endorser have worked together before (e.g., maybe they are simply renewing an earlier-run campaign, etc.), then the advertiser may simply accept the bid. As another example, the advertiser may wish to negotiate various bid-related details with the potential endorser, such as, for example, the price of the endorsement, the type of advertisement to be used (e.g., text, display, etc.), the potential endorser's worth, the final appearance of the endorsement, the length of time the endorsement will be served, etc. In some cases, the advertiser may create a "mockup" (or similar) of the proposed endorsement so that the potential endorser can get a better feel for how their name and/or image will be used to sell the product.

After the details have been hashed out between the advertiser and the endorser, the system may serve the endorsement, as illustrated at block 315. As discussed above, the endorsement may be a text ad, display ad, or something else entirely, and may appear alongside search results or on a web page completely separate from the system (e.g., a weblog that displays ads supplied by the system, etc.).

As illustrated at block 320, the system may receive payment from the advertiser for running the endorsement and may pay the endorser for his role. Similar to other advertising infrastructures, the system may calculate the number of clicks/impressions associated with the endorsement (or it may use some other metric or combination of metrics) to come up with the cost to the advertiser for routing his ads through the system; such cost may also be agreed on beforehand (i.e., before any endorsement is served).

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, at block 300, the advertiser may select various potential endorsers to endorse the products it has listed on the exchange (instead of the endorser selecting the listed products). As another example, at block 305, the potential endorser may evaluate bids from various advertisers (instead of the advertiser evaluating the bids of potential endorsers).

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of facilitating product endorsement through Internet advertisements, said method comprising:
    providing advertisers with access to identities, including names, of potential endorsers prior to communicating with the potential endorsers;
    accepting a bid via a network, from either an advertiser who is associated with a geographical region or a potential endorser who is a local celebrity in the geographical region, for a product endorsement;

enabling bid-related communication, between the advertiser and the potential endorser, via the network;

receiving an indicator via the network from an Internet user that specifies that the Internet user is associated with the geographical region; and serving an endorsement associated with the bid via the network to the Internet user based on the Internet user being associated with the geographical region.

2. The method of claim 1 further comprising verifying an identity of the potential endorser.

3. The method of claim 2 further comprising displaying, substantially at the same time as the endorsement, a symbol representing the verification of the potential endorser's identity.

4. The method of claim 1 further comprising storing a profile associated with the potential endorser, wherein the profile comprises at least one characteristic selected from the group consisting of:
   name;
   age;
   height;
   weight;
   description of the potential endorser;
   images of the potential endorser; or
   products the potential endorser is interested in endorsing.

5. The method of claim 1 further comprising storing a profile associated with the advertiser, wherein the profile comprises at least one characteristic selected from the group consisting of:
   name;
   size;
   reputation; and
   data associated with previous endorsements.

6. The method of claim 1 further comprising negotiating at least one of a plurality of terms associated with the bid, wherein the at least one of a plurality of terms comprises a characteristic selected from the group consisting of:
   price of the endorsement;
   type of the endorsement;
   the potential endorser's worth;
   appearance of the endorsement; or
   length of time the endorsement will be served.

7. The method of claim 6 wherein a potential endorser's worth is a function of the performance of the potential endorser's previous endorsements.

8. The method of claim 1 further comprising storing at least one of a plurality of products for which the advertiser wishes to have endorsed.

9. The method of claim 1 further comprising storing at least one of a plurality of products for which the potential endorser has an interest in endorsing.

10. The method of claim 1 further comprising accepting a payment from the advertiser for serving the endorsement.

11. The method of claim 1 further comprising paying the potential endorser for the endorsement.

12. A computer-readable medium encoded with a computer-executable program to perform a method of facilitating product endorsement through Internet advertisements, said method comprising:
   providing advertisers with access to identities, including names, of potential endorsers prior to communicating with the potential endorsers;
   accepting a bid, from either an advertiser who is associated with a geographical region or a potential endorser who is a local celebrity in the geographical region, for a product endorsement;
   enabling bid-related communication, between the advertiser and the potential endorser; and
   serving an endorsement associated with the bid to an Internet user based on the Internet user being associated with the geographical region.

13. The computer-readable medium of claim 12 further comprising verifying an identity of the potential endorser.

14. The computer-readable medium of claim 13 further comprising displaying, substantially at the same time as the endorsement, a symbol representing the verification of the potential endorser's identity.

15. The computer-readable medium of claim 12 further comprising storing a profile associated with the potential endorser, wherein the profile comprises at least one characteristic selected from the group consisting of:
   name;
   age;
   height;
   weight;
   description of the potential endorser;
   images of the potential endorser; or
   products the potential endorser is interested in endorsing.

16. The method of claim 12 further comprising storing a profile associated with the advertiser, wherein the profile comprises at least one characteristic selected from the group consisting of:
   name;
   size;
   reputation; and
   data associated with previous endorsements.

17. The method of claim 12 further comprising negotiating at least one of a plurality of terms associated with the bid, wherein the at least one of a plurality of terms comprises a characteristic selected from the group consisting of:
   price of the endorsement;
   type of the endorsement;
   the potential endorser's worth;
   appearance of the endorsement; or
   length of time the endorsement will be served.

18. The computer-readable medium of claim 17 wherein a potential endorser's worth is a function of the performance of the potential endorser's previous endorsements.

19. The computer-readable medium of claim 12 further comprising storing at least one of a plurality of products for which the advertiser wishes to have endorsed.

20. The computer-readable medium of claim 12 further comprising storing at least one of a plurality of products for which the potential endorser has an interest in endorsing.

21. The computer-readable medium of claim 12 further comprising accepting a payment from the advertiser for serving the endorsement.

22. The computer-readable medium of claim 12 further comprising paying the potential endorser for the endorsement.

* * * * *